March 28, 1961     T. E. MEAD     2,976,961
PRESSURE FLUID CONTROL DEVICE
Filed April 28, 1958     2 Sheets-Sheet 1
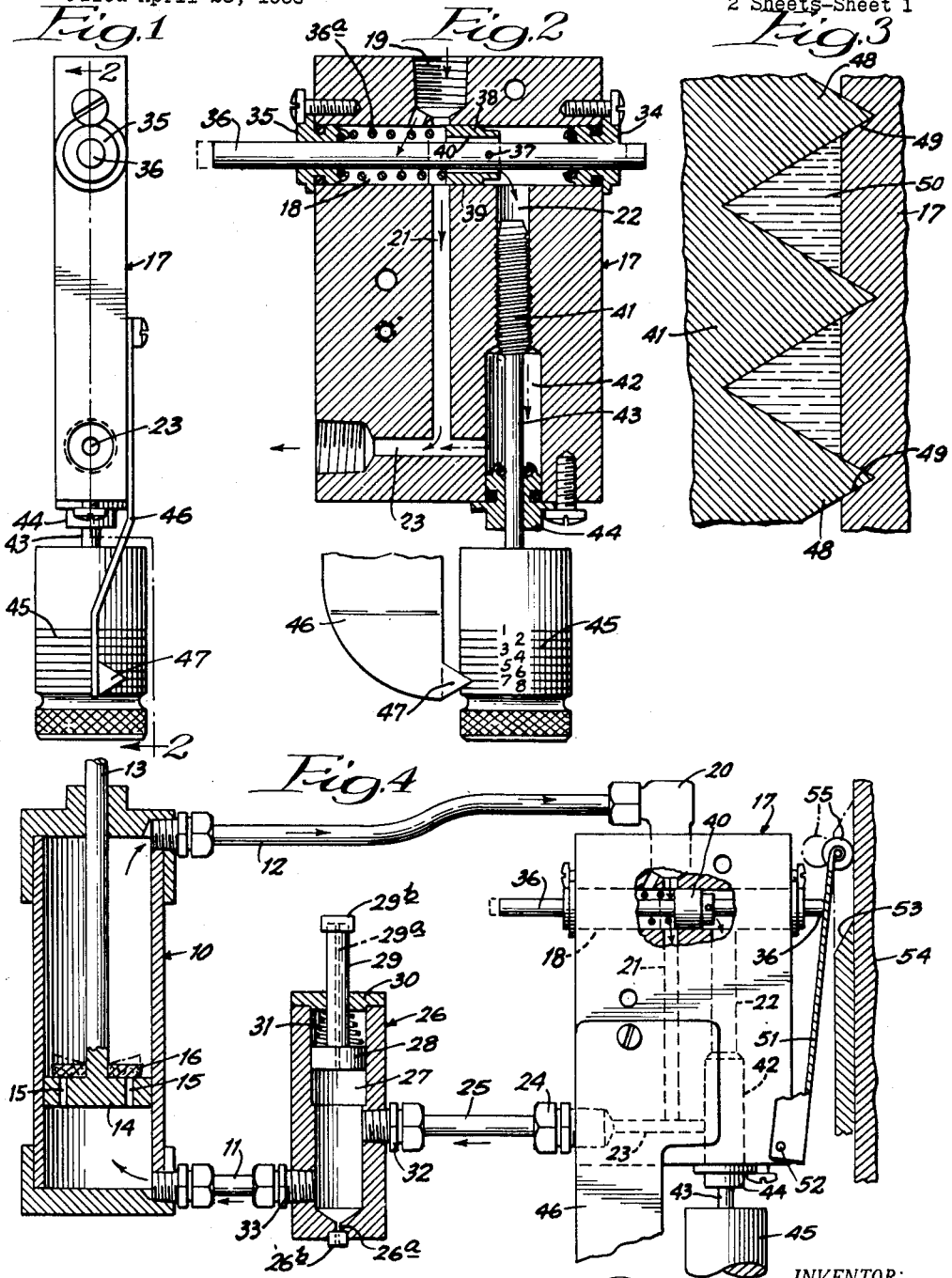
INVENTOR:
Theodore E. Mead,
BY
Dawson, Tilton, Fallon & Lungmus,
ATTORNEYS.

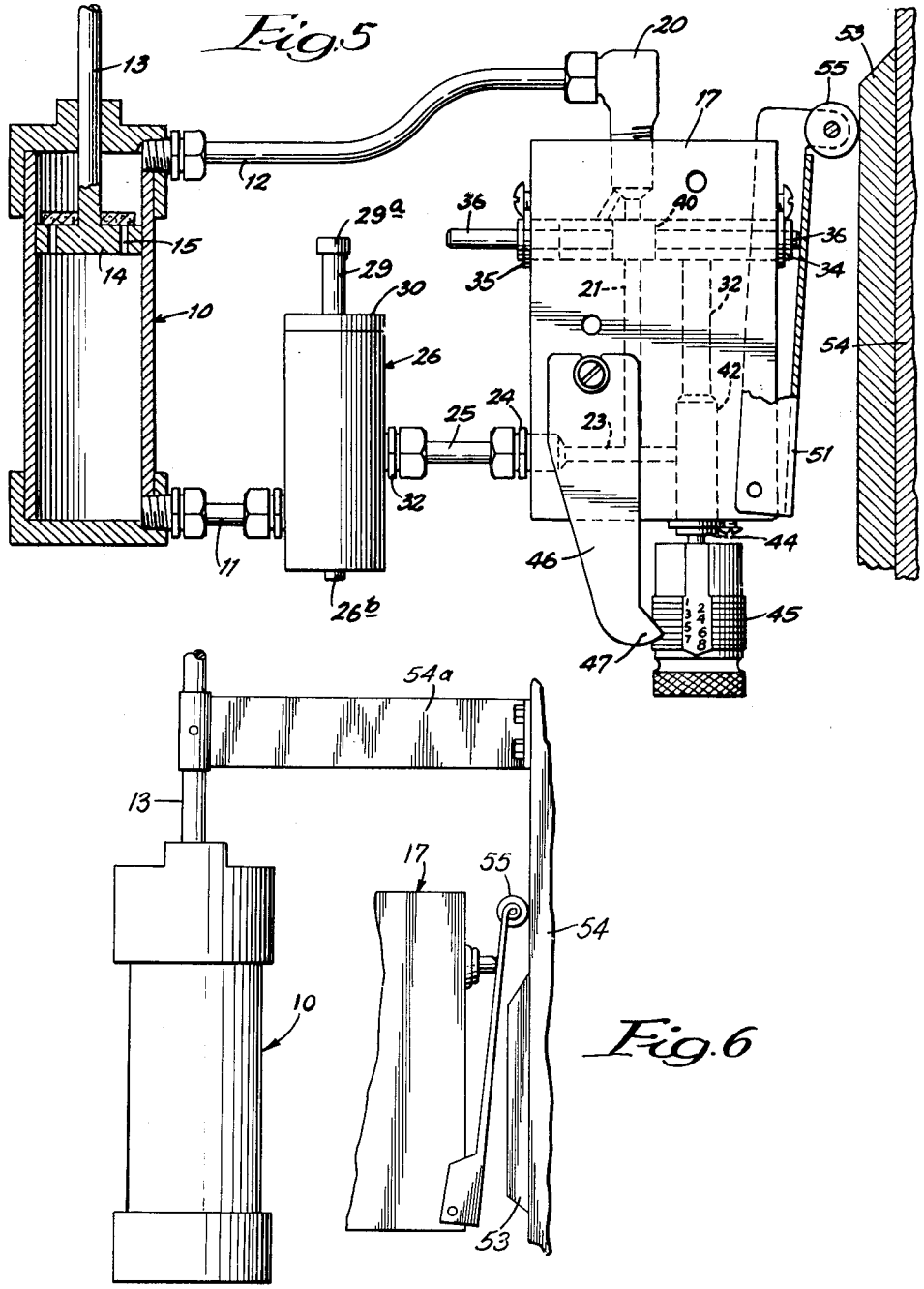

United States Patent Office 2,976,961
Patented Mar. 28, 1961

2,976,961

PRESSURE FLUID CONTROL DEVICE

Theodore E. Mead, 1006 Michigan Ave., Wilmette, Ill.

Filed Apr. 28, 1958, Ser. No. 731,173

3 Claims. (Cl. 188—97)

This invention relates to a pressure fluid control device, and is particularly useful in connection with hydraulic or pneumatic systems, and the like.

This application is a continuation-in-part of my co-pending application, Serial No. 537,253, filed September 25, 1955, and now abandoned.

One of the major problems in the design and manufacture of fluid pressure systems, particularly an oil-hydraulic system, is the inevitable presence of foreign matter in the fluid. This foreign matter may be in the form of air-bubbles in oil systems, oil droplets in air systems, or minute particles of solid matter in either. Many years of research and experiment have been spent trying to eliminate the foreign matter by means of elaborate filters, traps, etc., without success. The problem is especially acute where speed-control or "needle" valves are employed to control the rate of flow of the fluid through the system. Practically all speed-control valves depend on a restricted orifice to retard the flow of fluid, and where small volumes of fluid are involved, such orifices must be so small that the foreign matter cannot entirely pass through them but tends to accumulate at and clog the orifice. In such an environment, the foreign particle accumulation can cause double damage. Not only can it retard fluid flow, but it can cause the valve element to stick.

My discovery springs from the acceptance of the fact that foreign matter is inevitable and cannot be eliminated, and I provide a valve which is so designed as to operate uniformly and predictably with the foreign matter present in the fluid. To this end, I provide in a valve structure a passage which is amply large to pass the largest conceivable particles of foreign matter, and the operation of the valve does not depend on restricting the orifice or providing a constriction to slow the flow of fluid, but I utilize another principle—friction—to achieve the desired result.

My discovery is that an effective control of pressurized fluid can be obtained while permitting flow of the foreign matter without stoppage or clogging through the use of an extensive passage whose length is great in relation to its cross-sectional area and which furnishes the requisite amount of friction by reason of its length, while at the same time providing means for changing the length of the passage to control thus the rate of flow. This, then, can eliminate a major difficulty previously faced in employing control systems, especially where the speed of a machine is dependent upon the rate of flow of a pressurized fluid.

Further, I have discovered from exhaustive tests that the presence of foreign matter within the oil-hydraulic system, etc., has no effect on the rate of flow of fluid through the passage, provided the passage is free of restrictions, and the length of the passage is the factor utilized for creating the frictional resistance to flow. In the tests, I have found that oil containing so much air as to constitute virtually foam, flows through my elongated frictional passage under high pressure at the same rate as clean solid oil. Moreover, chips and particles of metal, rubber, etc., wearing off of the working parts of a hydraulic system, or remaining in it from the manufacturing operations, are carried in suspension through the frictional passage of substantially uniform cross section without altering the rate of flow.

By way of example, I have discovered that in a hydraulic-oil system associated with the operating member of a press, a highly effective control can be maintained over long periods of time, irrespective of the presence of foreign matter in the oil, etc., by utilizing a movable valve element such as a screw within a passage having a bore substantially fitting the major diameter of the screw and communicating with a larger passage so that by longitudinal movement of the screw, the length of the passage can be regulated, the screw within the narrow passage providing with the walls a tortuous flow passage for the oil which is substantially uniform in cross section and capable of passing all of the foreign matter without clogging. In such a structure, it is the length of the passage and the frictional force exerted by such length, that effects the control rather than the size of the flow passage itself, and the use of such a means, in combination with the passages of different diameters, enables the extent of the friction to be varied rapidly and accurately while maintaining a nice and nonfluctuating control.

An object of the present invention is to provide a control valve means for a fluid pressure system in which the valve is movable to vary the length of a flow channel or passage which is large enough to pass foreign matter readily therethrough but long enough to restrict by friction the flow of the fluid. Another object is to provide, in combination with such a valve, means for by-passing the valve and then automatically rendering the by-passing inoperative and the valve operative. A still further object is to provide, in a hydraulic-oil system for regulating the speed of a press, means for controlling the flow of the oil so as to permit rapid flow at one time and restricted flow at another time, valve control means being employed for restricting the flow through the use of an elongated tortuous passage, the valve control means being responsive to the movement of the press. Yet another object is to provide in such a structure a valve movable within cylinder bores of different diameters so as to provide in one of the bores an effective elongated frictional passage of substantially uniform diameter, the valve being movable into an enlarged bore of the cylinder to shorten the passage, providing thereby a variable speed control. Still another object is to provide in such a structure superficial or surface threads within the smaller diameter passage and a valve member having threads meshing with said threads whereby longitudinal movement of the valve is effected by rotating the same. A still further object is to provide a pressure fluid control system of novel construction providing compensating means for the fluid displaced by working parts entering the system. Other specific objects and advantages will appear as the specification proceeds.

The invention is shown, in an illustrative embodiment, by the accompanying drawing, in which—

Figure 1 is an end view in elevation of a fluid pressure control device embodying my invention; Fig. 2, a sectional view, the section being taken as indicated at line 2—2 of Fig. 1; Fig. 3, a broken and greatly enlarged sectional detail view showing a portion of the flow passage provided by the screw valve means; Fig. 4, a broken sectional view showing the control mechanism in use with a pressure fluid system, the main piston being near the bottom of its stroke; Fig. 5 a view similar to Fig. 4 but showing the piston in the upper portion of its stroke; and Fig. 6, a fragmentary view similar to Figs. 4 and 5.

In the illustration given, the control mechanism embodying my invention is illustrated in connection with an air-hydraulic drill press feed in which an air cylinder is employed for power and a hydraulic cylinder is employed for speed control. The hydraulic cylinder for speed control is indicated by the numeral 10 and has at its bottom an inlet 11 and at its top an outlet 12. The feed control stem for the drill press is indicated by the numeral 13, and the stem is provided with a piston 14 having flow passages 15 therethrough and controlled by a flexible sealing valve 16. Upward movement of the piston 14 and the stem 13 is controlled by the outflow of oil through the outlet pipe 12, and by regulating the rate of flow through the pipe 12, the movement of the control stem 13 and the speed of the press is regulated. However, it is to be appreciated that it may be desirable to merely regulate the speed of movement of stem 13 which is, of course, equally possible through the invention disclosed here.

In the practice of my invention, I provide a control block 17 which is provided with a transverse opening 18 near its top communicating with the inlet opening 19. A fitting 20 connects the conduit 12 with the inlet opening 19. Communicating with the transverse passage or opening 18 are two downwardly-extending passages, including a by-pass channel 21 and a valve-controlled channel 22. Both channels communicate with a horizontal outlet passage 23 which is connected by fitting 24 with the return pipe 25.

Extending between the return pipe 25 and the inlet pipe 11 is a compensating or expansion device 26. This device consists of a casing providing a chamber 27, in the upper portion of which is mounted a slidable piston 28 having a guide stem 29 extending through the top closure 30 of the device. A compression spring 31 engages the closure 30 and normally urges the piston 28 in a downward direction. Oil enters the chamber 27 through the fitting 32 which connects the return pipe 25 with the compensating device 26. The oil leaves the lower end of the chamber 27 through the fitting 33 which connects the chamber with the inlet pipe 11 of the structure 10. As the stem 13 moves upwardly and out of the chamber of the device 10, the filled area within the system is reduced and the piston 28 is urged downwardly to take up the space formerly occupied by the stem 13. As the stem moves downwardly, oil within the filled system is displaced and the piston 28 rises within the chamber 27 to provide the increased area. The stem 29 is provided with an axial hole 29a through which air may be released when necessary, and the top of the hole is normally closed by a removable seal or closure 29b. The body providing chamber 27 is provided at its bottom with a drain-hole 26a which is normally closed by a threaded plug 26b, and the plug may be provided with a screw slot for convenient removal. The expansion device or member 26 thus serves as an air trap as well as an expansion chamber.

In the control block 17, the transverse passage 18 is closed at its ends by the closures 34 and 35, each of the closures being centrally apertured to receive a slide shaft 36. Secured to the slide shaft 36 by a pin 37 is a by-pass valve 38 having a lower sealing surface 39 adapted to cover and seal the by-pass 21 when the shaft 36 is moved to the left. In the latter sealing position, the liquid can flow through the inner passages 40 of the valve 38, as indicated by the arrow in Fig. 2. The passage 22 has an upper area of reduced diameter snugly receiving the valve 41, and the passage is enlarged at 42. The stem 43 of the valve 41 extends downwardly and through the closure 44 and is equipped at its end with an operating knob 45. The operating knob 45 may be provided with graduated or spaced lines provided with numerals so as to indicate the position of the valve 41 and the rate of flow effected by such position, and a marker 46 may be supported so as to bring a finger or pointer 47 thereof into alignment with the graduated lines or numbers placed upon the knob 45. The location of the scale or markers may be reversed with respect to the members 46 and 45, if desired.

The valve 41 is illustrated in the form of a screw which is preferably of uniform diameter throughout and having on its outer surface threads 48 engaging thread recesses or grooves 49 in the block wall 17, as illustrated best in Fig. 3. If desired, the threaded member 41 may be supported upon a threaded shaft and the threads of the member 41 may be brought into snug engagement with the walls of the passage 22, but I prefer to have the slight threaded engagement, as illustrated in Fig. 3, because the interlocking thread portions not only serve as a seal for the passages, but also provide the means for advancing or retracting the valve 41 as the stem thereof is rotated.

It is highly desirable that the passages 50 formed by the threads 48 and the walls of the passage 22 be substantially uniform throughout so that there is presented a passage of uniform cross-section able to receive and pass the foreign matter so that no clogging occurs, while at the same time the extreme length of the passage 50 provided by the screw furnishes the desired friction for controlling the rate of flow. While any elongated member moving within the channel or passage 22 may be provided with grooves or tortuous passages running in any direction for supplying the frictional resistance desired, I prefer to employ a screw or other device providing helical passages, because by this means an extremely long passage can be provided within a very short space, and in the regulation of the flow, the valve body 41 need be moved a relatively short distance. By providing the small diameter passage 22 in juxtaposition to the large diameter passage 42, the valve member 41 may be moved readily from one of the passages into the other, and as the valve 41 is moved from the small passage 22 into the large diameter passage 42, that portion of the screw 41 entering the large passage 42 becomes inoperative as a resistance means. In other words, the resistance to the flow of the fluid is varied by moving the member 41 into and out of the passage 22.

In the operation of a drill press or other mechanical device, it is often desirable to move the parts rapidly through a part of their movement, as, for instance, up to the point where the drill is about to engage the material, and for this purpose I provide a by-pass for the fluid about the control valve 41. To accomplish this, a working part of the mechanism is employed to reciprocate the shaft 36 so that when rapid movement is desired, the shaft is drawn to the right, leaving the by-pass passage 21 uncovered, and then moving the shaft 36 to the left when it is desired to have the fluid pass through the passages formed by the control valve 41.

As shown best in Figs. 2 and 4, the shaft 36 is normally urged to the right by means of the compression spring 36a which extends between the member 35 and the valve 38 pinned to the shaft 36. Lever 51 is pivoted at 52 on a pin through the part 17 and the lever at its upper end engages one end of the shaft 36. A cam 53 is supported upon a part 54 attached to the working mechanism conveniently, as by bracket 54a, to stem 13. As the part 54 moves upwardly with stem 13, part 54 engages a roller 55 secured to the lever arm 51 and presses the lever arm, and thereby the shaft 36, inwardly to close the by-pass passage 21. From that point on, the flow of the pressure fluid is through the tortuous passages 50 about the screw 41 and the rate of movement of the press or other device is controlled by the frictional resistance presented by such flow passages.

In Fig. 4, the valve 40 allows the flow of oil to pass directly through the by-pass passage 21, while in Fig. 5, the valve 40 is moved into a position closing the passage 21 and the flow of oil necessarily passes through the tortuous passage provided by the valve member 41.

The closures 34, 35 and 44, as shown best in Fig. 2, provide outside and inside seals. Such cartridge-like seals are extremely easy to install and replace, while at the same time providing highly effective inside and outside seals, the innermost sealing rings being effective about the shafts which are slidably mounted in the closures, while the outside sealing rings are effective for sealing the closures themselves within the passage in which they are mounted.

*Operation*

In the operation of the structure, the stem 13 is secured to a feed such as a fluid pressure cylinder or other device, and the feeding of the device cannot exceed the speed of movement of the stem 13 and the piston 14. The piston 14 can move upwardly only as rapidly as the fluid leaves the chamber above the piston. The initial movement is relatively rapid, because the fluid passes through the pipe 12, by-pass 21, and thence backwardly through the passages 25, 27 and 11 into the lower part of the chamber provided by casing 10, as shown in Fig. 4. When, however, the drill or other tool approaches the work, a member associated therewith and illustrated by the part 54 brings the cam 53 into engagement with the roller 55 and swings the lever 51 inwardly to press shaft 36 to the left, as shown in Fig. 5. As the shaft 36 moves to the left, the valve land 39 is brought over the by-pass 21 to seal it, and the flow of fluid thereafter must be through the valve passages 40 and thence down through the passage 22, enlarged passage 42, and thence back through the passages 25, 27 and 11 to the chamber of casing 10. Such flow, however, is now rendered difficult and slow by reason of the extent of the frictional passage 50 formed within the channel or passage 22. If the thread-equipped valve member 41 is located entirely within the threaded bore 22, the greatest frictional resistance is interposed against the flow of the fluid. When, however, the threaded member 41 is partially withdrawn into the enlarged chamber 42, the portion thereof which is thus withdrawn is no longer operative in presenting friction against the fluid flow, and a greater rate of flow through passage 22 is brought about. The extent or the rate of flow can be determined by the graduated line on the knob 41 brought into alignment with the pointer 47 of the member 46. The rate of flow can be controlled during the operation of the press or any other device by simply rotating the knob 45 to bring one or more of the lines thereof into alignment with the pointer 47.

When the drill has been moved through the material and the parts are retracted, the member 54 moves downwardly to the position shown in Fig. 4, thus releasing the roller 55 so that it may swing outwardly and carry therewith the shaft 36 to the position shown in Fig. 2, in which the control fluid is by-passed through passage 21, thus permitting rapid movement of the parts.

In all of the operations, the varying volume within the system produced by the movement of the stem 13 into and out of the system is compensated for by the expansion device 27 in which the spring-urged piston 28 is permitted to rise and fall, while still maintaining the desired pressure upon the system.

As a specific example of the process, I have employed a screw valve 41 having threads ¼-20, the threaded portion extending from one-fourth of an inch to one inch. With this structure, the best results have been obtained when the threads extend from one-half to three-fourths of an inch.

With the structure shown, I find that the foreign particules pass readily through the relatively large uniform passage 50, and no clogging occurs even during long periods of use. The control device may be set at a certain point, and it is found that the rate of feed remains the same at this setting through long periods of continuous operation.

From observation of the operation of the apparatus, it is my belief that air bubbles form in the hydraulic (oil) system, and that under the very high pressure of the system, the oil bubbles become very small but in such compressed condition in effect constitute foreign matter and are just as effective in preventing flow or clogging the conventional system as are the particles of metal, rubber, etc., found in the system. In any event, whatever be the form or character of the foreign particles, I find that they do not in any way interfere with the operation of the system which is controlled as above described, because the passage 50 is large enough to allow such material to flow through while at the same time I obtain the desired control through the provision of extensive flow passages arranged within a small area.

While, of course, the frictional flow passages may vary in size, particularly near the ends of the screw, I prefer to have the bulk of the screw body 41 form with the wall of housing 17 a flow passage 50 of substantially uniform cross section so that ample provision is afforded for the flow therethrough of the fluid containing the foreign materials, while at the same time affording substantial frictional resistance to flow. Should the screw member have flow passages at either end thereof which are larger than the passage 50, these will not interfere with the operation of the effective portion of the screw in providing the desired frictional resistance.

While, in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. In a closed pressurized hydraulic fluid control system for regulating the movement of a reciprocating work piece, a fluid pressure cylinder and unit, said unit being equipped with a piston rod moving inwardly and outwardly of the cylinder to vary the volume of the system, the piston of said unit being equipped with a one-way valve, means connecting the piston rod portion of said unit with said work piece, flow ports at each end of said unit, an external pressure circuit communicating the ends of said unit to circulate fluid from one end of said unit to the other, said unit including a casing having a valve passage and a by-pass passage, the valve passage having a portion of small diameter and a portion of large diameter communicating with each other, a screw member in said passage portion of small diameter and providing with the walls thereof an elongated frictional flow passage, means for moving said screw member longitudinally of both valve passage portions, said casing providing a cross passage between said valve passage and said by-pass passage, a slidable shaft in said cross passage, a valve carried by said shaft for opening said by-pass when the valve is in one position and closing said by-pass when the valve is in another position, a spring urging said shaft in one direction and a cam-operated part on said work piece engageable with said shaft to move it in the opposite direction, and a compensator housing interposed in said circuit between said casing and said unit.

2. The structure of claim 1 in which said casing is constructed with a movably-mounted arm engaging one end of said shaft and equipped at its upper end with a roller, said roller being engageable with said cam-operated part.

3. In a closed pressurized hydraulic fluid control system, a control cylinder equipped with a reciprocating piston and a piston rod, the rod moving inwardly and outwardly of the cylinder to vary the volume of the system, the piston being equipped with a one-way valve, a fluid flow port at one end of said cylinder and communicating with a first port in a flow restrictor casing, a flow port in the other end of said cylinder and communicating with a second port in said flow restrictor casing, a compensator interposed between said casing and said cylinder, said casing being equipped with a by-pass passage and a valve passage arranged in parallel, each passage communicating said first and second ports of said flow restrictor casing, the valve passage providing high resistance to fluid flow while the by-pass passage provides a relatively low resistance thereto, said relatively high resistance being provided by a threaded member movably mounted in said valve passage, the threaded member cooperating with the walls of said passage to provide an elongated frictional flow passage, a cross passage in said body extending between said valve passage and said by-pass passage, closures at each end of said cross passage, said closures slidably carrying a shaft, a valve mounted on said shaft for movement thereto into covering and uncovering relation with said by-pass passage, and means connecting said piston rod and shaft for moving said shaft to position the valve thereof in closing relation with said by-pass passage whenever said piston rod is adjacent one end of its travel.

References Cited in the file of this patent

UNITED STATES PATENTS

| | | |
|---|---|---|
| 982,088 | Orlopp | Jan. 17, 1911 |
| 1,629,120 | Ripple | May 17, 1927 |
| 1,812,533 | Hunt | June 30, 1931 |
| 1,869,604 | McWhirter | Aug. 2, 1932 |
| 1,880,234 | Bullock et al. | Oct. 4, 1932 |
| 2,742,113 | O'Connor | Apr. 17, 1956 |